United States Patent
Huang et al.

(10) Patent No.: US 10,542,294 B2
(45) Date of Patent: Jan. 21, 2020

(54) METHOD AND APPARATUS OF VIDEO DATA PROCESSING WITH RESTRICTED BLOCK SIZE IN VIDEO CODING

(71) Applicant: MEDIATEK INC., Hsin-Chu (TW)

(72) Inventors: Han Huang, San Jose, CA (US);
Tzu-Der Chuang, Zhubei (TW);
Ching-Yeh Chen, Taipei (TW);
Yu-Wen Huang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/084,778

(22) PCT Filed: Mar. 10, 2017

(86) PCT No.: PCT/CN2017/076321
§ 371 (c)(1),
(2) Date: Sep. 13, 2018

(87) PCT Pub. No.: WO2017/157249
PCT Pub. Date: Sep. 21, 2017

(65) Prior Publication Data
US 2019/0075328 A1 Mar. 7, 2019

Related U.S. Application Data

(60) Provisional application No. 62/445,284, filed on Jan. 12, 2017, provisional application No. 62/408,724, (Continued)

(51) Int. Cl.
*H04N 19/96* (2014.01)
*H04N 19/176* (2014.01)
(Continued)

(52) U.S. Cl.
CPC .......... *H04N 19/96* (2014.11); *H04N 19/119* (2014.11); *H04N 19/134* (2014.11);
(Continued)

(58) Field of Classification Search
CPC ....... H04N 19/96; H04N 19/176; H04N 19/70
See application file for complete search history.

(56) References Cited

U.S. PATENT DOCUMENTS

| 10,368,051 B2* | 7/2019 | Jiang | H04N 13/15 |
| 2017/0223352 A1* | 8/2017 | Kim | H04N 19/117 |

(Continued)

FOREIGN PATENT DOCUMENTS

| CN | 103024389 A | 4/2013 |
| CN | 103621086 A | 3/2014 |

(Continued)

OTHER PUBLICATIONS

International Search Report dated May 31, 2017, issued in application No. PCT/CN2017/076321.
(Continued)

*Primary Examiner* — Tsion B Owens
(74) *Attorney, Agent, or Firm* — McClure, Qualey & Rodack, LLP (57) ABSTRACT

A video data processing method comprises receiving input data associated with a current picture, determining a size for a current coding tree unit (CTU) or a current coding unit (CU) in the current CTU, and if the size, a width, or a height of the current CTU or CU is greater than a threshold, the encoder or decoder splits the current CTU or CU into multiple blocks until each block is not greater than the threshold. The current CTU or CU is processed for prediction or compensation and transform or inverse transform. The current CTU is processed according to CTU-level syntaxes signaled in a video bitstream. The encoder or decoder encodes or decodes the current CTU. The threshold corresponds to a maximum supported transform unit (TU) size for the encoder or decoder.

19 Claims, 8 Drawing Sheets

Related U.S. Application Data filed on Oct. 15, 2016, provisional application No. 62/309,001, filed on Mar. 16, 2016.

(51) Int. Cl.
*H04N 19/70* (2014.01)
*H04N 19/119* (2014.01)
*H04N 19/134* (2014.01)
*H04N 19/167* (2014.01)

(52) U.S. Cl.
CPC ......... *H04N 19/167* (2014.11); *H04N 19/176* (2014.11); *H04N 19/70* (2014.11)

(56) References Cited

U.S. PATENT DOCUMENTS

2018/0139441 A1* 5/2018 Choi ................... H04N 19/105
2018/0367809 A1* 12/2018 Hendry ................. H04N 19/70

FOREIGN PATENT DOCUMENTS

| | | |
|---|---|---|
| CN | 103957415 A | 7/2014 |
| CN | 104041049 A | 9/2014 |
| CN | 104125469 A | 10/2014 |
| CN | 105230020 A | 1/2016 |
| WO | 2013/003584 A1 | 1/2013 |
| WO | 2013/104198 A1 | 7/2013 |
| WO | 2014/047693 A1 | 4/2014 |
| WO | 2015/007200 A1 | 1/2015 |

OTHER PUBLICATIONS

Winken, M., et al.; "Transform codinginthe HEVC Test Model;" 2011 18th IEEE International Conference on Image Processing; Sep. 2011; pp. 3693-3696.

Wiegand, T., et al.; "WD2: Working Draft 2 of High-Efficiency Video Coding;" Joint Collaborative Team on Video Coding (JCT-VC) of ITU-T SG16 WP3 nad ISO/IEC JTC1/SC29/WG11; Jan. 2011; pp. 1-155.

Schwarz, et al.; "Chapter 3: Block Structures and Parallelism Features in HEVC;" Integrated Circuits and Systems; Aug. 2014; pp. 49-90.

An, J., et al.; "Quadtree plus binary tree structure integration with JEM tools;" Joint Video Exploration Team (JVET) of ITU-T SG 16 WP 3 and ISO/IEC JTC 1/SC 29/WG 11; Feb. 2016; pp. 1-10.

\* cited by examiner

METHOD AND APPARATUS OF VIDEO DATA PROCESSING WITH RESTRICTED BLOCK SIZE IN VIDEO CODING

CROSS REFERENCE TO RELATED APPLICATIONS

The present invention claims priority to U.S. Provisional Patent Application, Ser. No. 62/309,001, filed on Mar. 16, 2016, entitled "Methods of pattern-based MV derivation for Video Coding", U.S. Provisional Patent Application, Ser. No. 62/408,724, filed on Oct. 15, 2016, entitled "Methods of coding unit coding", and U.S. Provisional Patent Application, Ser. No. 62/445,284, filed on Jan. 12, 2017, entitled "Methods of coding unit coding". The U.S. Provisional Patent Applications are hereby incorporated by reference in their entireties.

TECHNICAL FIELD

The present invention relates to block-based video data processing in video coding. In particular, the present invention relates to video encoding and video decoding with restricted block size.

BACKGROUND

A video picture coded in the High Efficiency Video Coding (HEVC) standard may be partitioned in one or multiple slices, and each slice is partitioned into multiple coding tree units (CTU). In the main profile of HEVC, minimum and the maximum sizes of CTUs are specified by syntax elements in the sequence parameter set (SPS). Each CTU consists of a luma coding tree block (CTB) and corresponding chroma CTBs and syntax elements. The size of a luma CTB is chosen from 16×16, 32×32, or 64×64, with the larger sizes typically enabling better compression rate for simple or smooth texture areas. CTUs within a slice are processed according to a raster scan order.

HEVC supports partitioning of a CTU into multiple coding units (CUs) to adapt to various local characteristics using a quadtree partition process. For a 2N×2N CTU, it can be a single CU or can be split into four smaller blocks of equal sizes (i.e., N×N). The quadtree partitioning process recursively splits each CTU into smaller blocks until reaching leaf nodes of the quadtree coding tree. The leaf nodes of the quadtree coding tree are called the CUs in HEVC. The decision whether to code a picture area using Inter-picture (temporal) prediction or Intra-picture (spatial) prediction is made at the CU level. Since the minimum CU size can be 8×8, the minimum granularity for switching between different basic prediction types is 8×8.

Figure 1:
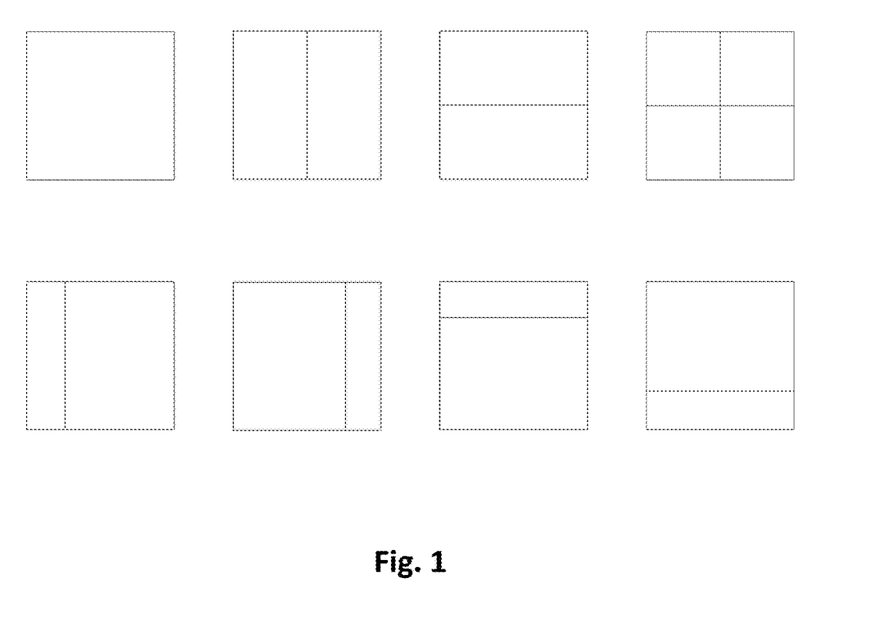
FIG. 1 illustrates eight prediction unit (PU) partition types supported in High Efficiency Video Coding (HEVC).

One, two, or four prediction units (PU) are specified for each CU according to one of the PU splitting types as shown in FIG. 1, where PU works as a basic representative block for sharing prediction information. FIG. 1 illustrates eight different PU splitting types supported in HEVC including symmetrical and asymmetrical splitting types. Inside each PU, the same prediction process is applied and relevant prediction information is transmitted to the decoder on a PU basis. After obtaining prediction residues by applying the prediction process on the PUs, a CU is partitioned into transform units (TUs) according to another quadtree structure, which is analogous to the quadtree coding tree used for obtaining the CUs from the LCU. The TU is a basic representative block of residues or transform coefficients for applying transform and quantization. The transformed and quantized residual signal of the TUs is encoded and transmitted to the decoder after transform and quantization on a TU basis.

Similar to the definition of CTB, coding block (CB), prediction block (PB), and transform block (TB) are defined to specify the sample array of a luma component or a chroma component associated with CU, PU, and TU, respectively. The quadtree partitioning process is generally applied simultaneously to both luma and chroma components, although exceptions apply when certain minimum sizes are reached for chroma components.

SUMMARY

A method and apparatus for processing video data in an encoding system and a decoding system are disclosed. Embodiments of an encoding system receive input data associated with a current picture of the video data, and determine a size for a current coding tree unit (CTU) for transmitting one or more CTU-level syntaxes. In some embodiments, the current CTU comprises one or more current coding units (CUs). The size, width, or height of the current CTU or the current CU is checked with a threshold, and if the size, width, or height of the current CTU or the current CU is greater than the threshold, the encoding system forces to split the current CTU or the current CU into multiple blocks until a size, width, or height of each block in the current CTU or the current CU is not greater than the threshold. The encoding system processes the current CTU or the current CU by prediction and transform. The encoding system also determines the CTU-level syntaxes for the current CTU and processes the current CTU according to the CTU-level syntaxes. The current CTU is encoded to form a video bitstream, and the CTU-level syntaxes are signaled in the video bitstream.

Embodiments of the video decoding system receive a video bitstream associated with a current coding tree unit (CTU) in a current picture, and parse one or more CTU-level syntaxes and residues for the current CTU from the video bitstream. The current CTU may include one or more current coding units (CUs). A size of the current CTU or the current CU is determined and compared with a threshold, and if the size, width, or height of the current CTU or the current CU is greater than the threshold, the decoding system inferred to split the current CTU or the current CU into multiple blocks until a size, width, or height of each block in the current CTU or the current CU is not greater than the threshold. The current CTU or the current CU is processed by prediction and inverse transform, and the current CTU is decoded according to the one or more CTU-level syntaxes parsed from the video bitstream.

An embodiment of the threshold used to determine whether the current CTU or the current CU is required further splitting corresponds to a maximum supported transform unit (TU) size, and an example of the maximum supported TU size is 128×128. The maximum supported TU size may be signaled in a sequence level, a picture level, or a slice level in the video bitstream to notify a decoder side. In some embodiments, the current CTU or the current CU is split using quadtree split or binary tree split if the size, width, or height of the current CTU or the current CU is greater than the threshold. In an embodiment, when the current CTU or the current CU is split using binary tree split, the current CTU or the current CU is split by a vertical split if the width or the size of the current CTU or the current CU is greater than the threshold; or the current CTU or the current CU is split by a horizontal split if the height or the size of the current CTU or the current CU is greater than the threshold. In an embodiment, a split flag is signaled in the video bitstream to indicate the splitting of the current CTU or the current CU.

Some embodiments of the CTU-level syntaxes are various syntaxes used for in-loop filter processing such as sample adaptive offset (SAO), adaptive loop filter (ALF), and deblocking filter, and the encoding system may signal one or more of the CTU-level syntaxes for the current CTU if the corresponding in-loop filter processing is applied to the current CTU. The decoding system may parse one or more of the CTU-level syntaxes for the current CTU if the corresponding SAO, ALF, and/or deblocking filter processing are applied to the current CTU.

In an embodiment, the current picture is divided into CTU groups and the CTU-level syntaxes for the current CTU are shared with other CTUs in the same CTU group. An example of the CTU group includes M×N CTUs, where M and N are positive integer numbers, and a size of the CTU group is a predefined value or is signaled in a sequence level, a picture level, or a slice level in the video bitstream. The CTU-level syntaxes shared by the CTU group may be one or a combination of syntaxes for sample adaptive offset (SAO), adaptive loop filter (ALF), and deblocking filter.

In yet another embodiment, the current CTU or the current CU at a picture boundary is split using quadtree split, vertical binary tree split, or horizontal binary tree split according to a location of the current CTU, the width and height of the current CTU or the current CU, and a width and height of the current picture.

Some embodiments of the video encoding or decoding system implicitly splits the current CTU or the current CU into multiple blocks if the size, width, or height is greater than the threshold, and then the video encoding or decoding system determines whether to further split the current CTU or CU according to a splitting decision. The splitting decision may be decided according to Rate and Distortion Optimization (RDO) at the encoder side, and the video encoding system signals information associated with the splitting decision in the video bitstream to indicate splitting of the current CTU or CU. The video decoding system decodes the splitting decision and splits the current CTU or CU according to the decoded splitting decision. The blocks generated by the splitting decision are processed by prediction and transform.

In some other embodiments, the current CTU or the current CU is processed as one block if the size, width, or height is not greater than the threshold, and prediction processing and transform processing are performed on each block in the current CTU or the current CU without further partitioning. In another embodiment, the video encoding system determines the size of the current CU according to a splitting decision, and the current CU is split into multiple blocks if the size, width, or height is greater than the threshold. The prediction processing is performed on the current CU and the transform processing is performed on each block in the current CU if the current CU is split into multiple blocks.

Aspects of the disclosure further provide an apparatus for the video encoding system and an apparatus for the video decoding system for processing video data with restricted block size. The apparatus compares a size of a current CTU or the current CU with a threshold and splits the current CTU or the current CU if the size, width, or height of the current CTU or the current CU is greater than the threshold.

Aspects of the disclosure further provide a non-transitory computer readable medium storing program instructions for causing a processing circuit of an apparatus to perform a video encoding method or a video decoding method. The video encoding or decoding method includes checking if a current CTU or a current CU has a size, width, or height greater than a threshold and splitting the current CTU or the current CU accordingly to generate block(s) with a size not greater than the threshold. CTU-level syntaxes such as syntaxes for SAO, ALF or deblocking filter are signaled for the current CTU or a CTU group containing multiple CTUs. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Different from the quadtree structure supported by the conventional video coding standard such as HEVC, a binary tree block partitioning structure can be used to split a video picture or a slice of video data. A block can be recursively split into smaller blocks according to splitting types such as symmetrical horizontal split and symmetrical vertical split. For a block under consideration, a flag is used to indicate whether to split the block into two smaller blocks. If the flag indicates splitting, another syntax element is signaled to indicate which splitting type is used, for example the vertical split or the horizontal split. The binary tree splitting process can be iterated until the size (width or height) for a splitting block reaches a minimum allowed block size (width or height).

The binary tree block partitioning structure is more flexible than the quadtree structure, since more partition shapes are allowed. However, the encoding complexity will also increase for selecting the best partition shape. In order to balance the complexity and coding efficiency, the binary tree structure is combined with the quadtree structure, which is called Quad-Tree-Binary-Tree (QTBT) structure. The QTBT structure shows satisfied coding performance compared to the quadtree structure in HEVC.

Figure 2A:
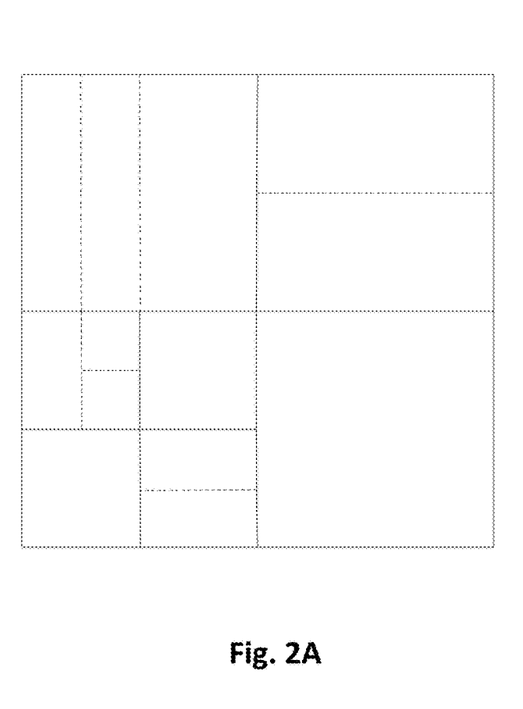
FIG. 2A illustrates an exemplary block partition according to a Quad-Tree-Binary-Tree (QTBT) structure.
Figure 2B:
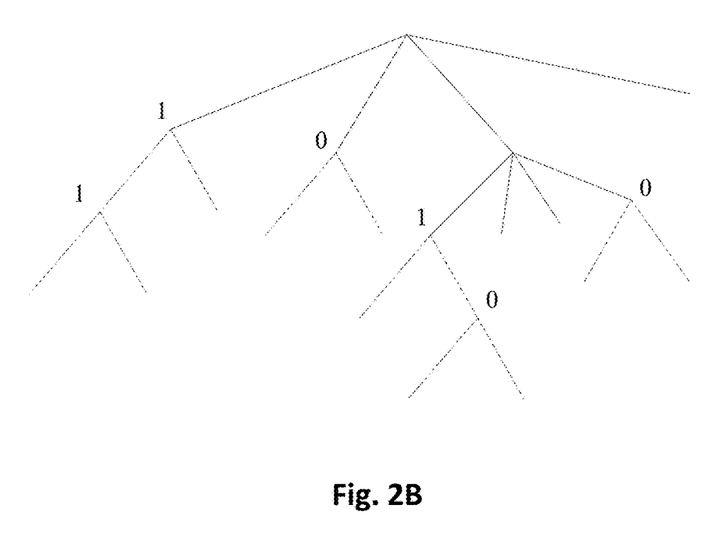
FIG. 2B illustrates a coding tree structure corresponding to the block partition of FIG. 2A.

An exemplary QTBT structure is shown in FIG. 2A, where a large block is firstly partitioned by a quadtree structure then a binary tree structure. FIG. 2A illustrates an example of block partitioning according to a QTBT structure and FIG. 2B illustrates a tree diagram for the QTBT structure corresponding to the block partitioning shown in FIG. 2A. The solid lines in FIGS. 2A and 2B indicate quadtree splitting and the dotted lines in FIGS. 2A and 2B indicate binary tree splitting. In each splitting (i.e., non-leaf) node of the binary tree structure, one flag indicates which splitting type (horizontal or vertical) is used, 0 indicates horizontal splitting and 1 indicates vertical splitting. The QTBT structure splits the large block in FIG. 2A into multiple smaller blocks, and these smaller blocks are further processed by prediction and transform coding. No further partitioning is applied to these smaller blocks to form different sizes of prediction unit and transform unit. In other words, each block generated by the QTBT partitioning structure is a basic unit for both prediction and transform processing. For example, the large block in FIG. 2A is a CTU with a size of 128×128, a minimum allowed quadtree leaf node size is 16×16, a maximum allowed binary tree root node size is 64×64, a minimum allowed binary tree leaf node width or height is 4, and a minimum allowed binary tree depth is 4. In this example, the CTU is first partitioned by a quadtree structure and the leaf quadtree block may have a size from 16×16 to 128×128. If the leaf quadtree block is 128×128, it cannot be further split by the binary tree structure since the size exceeds the maximum allowed binary tree root node size 64×64. The leaf quadtree block is used as the root binary tree block that has a binary tree depth equal to 0. When the binary tree depth reaches 4, non-splitting is implicit; when the binary tree node has a width equal to 4, non-vertical splitting is implicit; and when the binary tree node has a height equal to 4, non-horizontal splitting is implicit. This QTBT structure can be applied separately to luma and chroma components for the I-slice (i.e., Intra coded slice) and applied simultaneously to both luma and chroma components for the P- and B-slice. QTBT structure block partitioning for the luma component and the two chroma components may all be different when coding blocks in an I-slice.

In order to efficiently encode and decode high resolution video data such as 8K×4K video which uses 8000 pixels× 4000 pixels to represent each picture, the next generation video coding allows large basic representative blocks for video coding process such as prediction, transform, and in-loop filter. HEVC recursively splits each CTU into CUs, both PUs and TUs are partitioned from corresponding CUs according to a PU partition type and a quadtree partitioning structure respectively. To simplify the block partitioning method of HEVC, each leaf node of a partitioning structure such as the quadtree structure or the QTBT partitioning structure is set to be the basic representative block for both prediction and transform processing, so no further partitioning is required. In this case, the CU is equal to PU and also equal to TU. In some embodiments, the CTU is equal to CU, PU, and TU. Increasing the size of CTU and CU means the size supported for prediction and transform also needs to be increased. For example, when the size of a CTU is 256×256, the PU size and the TU size are also 256×256, however, the number of silicon gates of the transform logic grows exponentially as the TU size increases linearly. The silicon gate counts of the transform logic for the TU size equal to 256×256 is too large and too expensive to implement. The following embodiments provide some solutions to the issue raised by allowing large block sizes for video coding. Some embodiments of the present invention are applied to process video data with unified block partitioning for prediction and transform processing and with a restricted block size for transform and inverse transform. Some other embodiments are applied to process video data with separately block partitioning for prediction and transform processing but simplified the signaling of block partitioning.

First Embodiment A first embodiment is an encoder only constraint which regulates the encoders to generate TUs within a supported size for transform logic hardware implementation. An encoder of the first embodiment determines a size for each coding unit (CU) or prediction unit (PU) for both prediction processing and transform processing. An example of CU or PU size determination includes performing rate-distortion optimization (RDO) to select a best size using a partitioning method such as quadtree partitioning, binary tree partitioning or QTBT partitioning. The encoder then checks the size M×N of a current CU or PU with a threshold, and if the size, width M, or height N is greater than the threshold. For example, the threshold for the size is 128×128, and the threshold for M or N is 128. The threshold may be predefined or user-defined, and the threshold may be determined according to a maximum supported TU size. An example of the encoder transmits the maximum supported TU size in a sequence-level, picture-level, or slice-level of the video bitstream, for example the maximum supported TU size is signaled in the Sequence Parameter Set (SPS), Picture Parameter Set (PPS), or slice header. The encoder forces the current CU or PU to split into multiple TUs according to a quadtree split or binary tree split if the size, width M, or height N is greater than the threshold. The encoder may skip signaling a TU split flag in a video bitstream to decoders as the decoders also force to split the current CU or PU when the size, width, or height is greater than the threshold. In another example, the encoder may signal a TU split flag in the video bitstream, but the TU split flag is constrained to be 1 indicating splitting is performed at the encoder side. The size of TU is different from the size of CU or PU in this embodiment if the size of CU or PU is greater than the threshold; the size of TU is the same as the size of CU or PU if the size of CU or PU is not greater than the threshold. In one example, if the size, M or N of the current CU or PU is larger than the threshold and the quadtree split is used, the current CU or PU is split into four TUs and the encoder may or may not signal a TU split flag. In another example, if the width M is greater than the threshold and the binary tree split is used, the current CU or PU is split into two TUs by a vertical split and the encoder may or may not signal a TU split flag indicating vertical split is used or the encoder may signal a vertical TU split flag. If the height N is greater than the threshold and the binary tree split is used, the current CU or PU is split into two TUs by a horizontal split and the encoder may or may not signal a TU split flag indicating horizontal split is used or the encoder may signal a horizontal TU split flag. Compared to the HEVC standard which signals two separate block partitioning structures for CU and TU, the first embodiment of the present invention only signals one block partitioning structure for both CU and TU.

Second Embodiment A second embodiment is a normative solution for decoders decoding video data with large block size. A decoder according to the second embodiment decodes a video bitstream and determines block partitions of a current picture according to information such as split flags signaled in the video bitstream. When the decoder is processing a current CU or PU, it checks a size M×N of the current CU or PU, if the size is greater than a threshold, or if a width M or height N is greater than a threshold, the TU is inferred to be split without referring to a split flag. An example of the threshold is 128×128 for the size or 128 for the width or height. The threshold may be determined by parsing relevant information in the video bitstream or the threshold may be predefined or user defined. In one example, if quadtree splitting is applied for splitting, the current CU or PU is split into four TUs as the TU split flag is inferred to be 1 if the size, width M, or height N of the current CU or PU is greater than the threshold. In another example, if the binary tree splitting is applied for splitting, the current CU or PU is split into two TUs as the vertical or horizontal TU split flag is inferred to be 1 if the width M or height N is larger than the threshold.

In the first and second embodiments, if the size, width, or height of the current CU or PU is greater than the threshold, the encoder or decoder only forces to split the TUs, not the current CU or PU. In other words, the size of a current CU or PU is the same as the size of a current TU corresponding to the current CU or PU if the size, width, or height of the current CU or PU is not greater than a threshold. The size of the current CU or PU is different from the size of the current TU corresponding to the current CU or PU if the size, width, or height of the current CU or PU is greater than the threshold.

Figure 3:
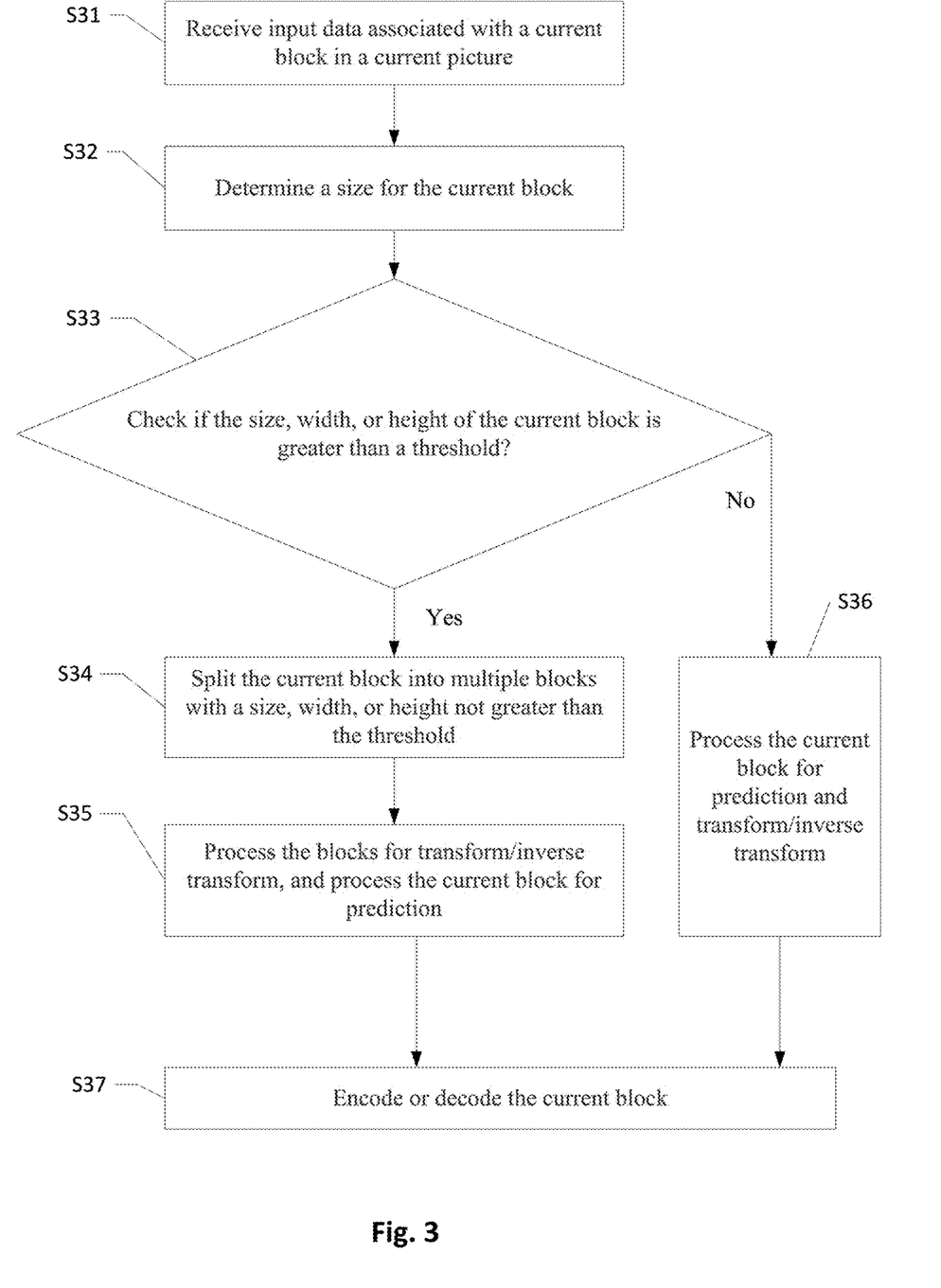
FIG. 3 is a flowchart illustrating an exemplary video coding system according to embodiments of the present invention.

FIG. 3 illustrates a flowchart for an exemplary video coding system incorporating the first or second embodiment of the present invention. The video coding system receives input data associated with a current block in a current picture in step S31, and the current block may be a current coding unit (CU) or a current prediction unit (PU). Step S32 determines a size for the current block, and step S33 checks if the size, width, or height of the current block is greater than a threshold. An example of the threshold corresponds to a maximum supported transform unit (TU) size. The video coding system splits the current block into multiple blocks with a size, width, or height not greater than the threshold in step S34 if the size, width, or height of the current block is greater than the threshold. The blocks split from the current block are processed by transform or inverse transform, and the current block is processed by prediction in step S35. If the size, width, or height of the current block is not greater than the threshold, step S36 processes the current block by both prediction and transform or inverse transform. The video coding system encodes or decodes the current block in step S37.

Third Embodiment A third embodiment not only forces an encoder to split a large CU or PU into multiple TUs, but also forces the CTU or CU to be split according to a comparison result. The encoder of the third embodiment first determines a size of each CTU for transmitting CU-level syntaxes. One or more CTU-level syntaxes are determined for each CTU and transmitted in a CTU level of a video bitstream. Some examples of the CTU-level syntaxes include syntaxes specified for in-loop filters such as sample adaptive offset (SAO), adaptive loop filter (ALF) and deblocking filter. For example, the CTU-level syntaxes may include one or a combination of SAO types, SAO parameters, ALF parameters, and boundary strength for deblocking filter. Video data in a CTU shares information carried in the CTU-level syntax. The encoder then checks a size M×N, width M, or height N of a current CTU or a current CU in the current CTU by comparing the size, width, or height with a threshold. If the size, width, or height is greater than the threshold, the video encoder splits the current CTU or CU into smaller blocks until the size, width, or height of the smaller blocks is not greater than the threshold. The threshold may be determined by a maximum supported TU size, which is either predefined or user defined. The threshold may be signaled in the video bitstream to notify decoders to force splitting when a corresponding CTU or CU is greater than the threshold. For example, the maximum supported TU size is signaled in a sequence-level, picture-level, or slice-level of the video bitstream. An example of partitioning the current CTU or CU splits the current CTU or CU into four blocks according to a quadtree split when the size, width, or height is greater than the threshold. Another example of partitioning the current CTU or CU splits the current CTU or CU into two blocks according to a vertical split when the size or width is greater than the threshold, or split the current CTU or CU into two blocks according to a horizontal split when the size or height is greater than the threshold. The video encoder determines whether to further split the current CTU or CU or the smaller blocks by performing RDO to decide best block sizes for prediction and transform processing. The video encoder performs prediction processing and transform processing on each block in the current CTU or CU and signals the splitting decision in the video bitstream.

Figure 4:
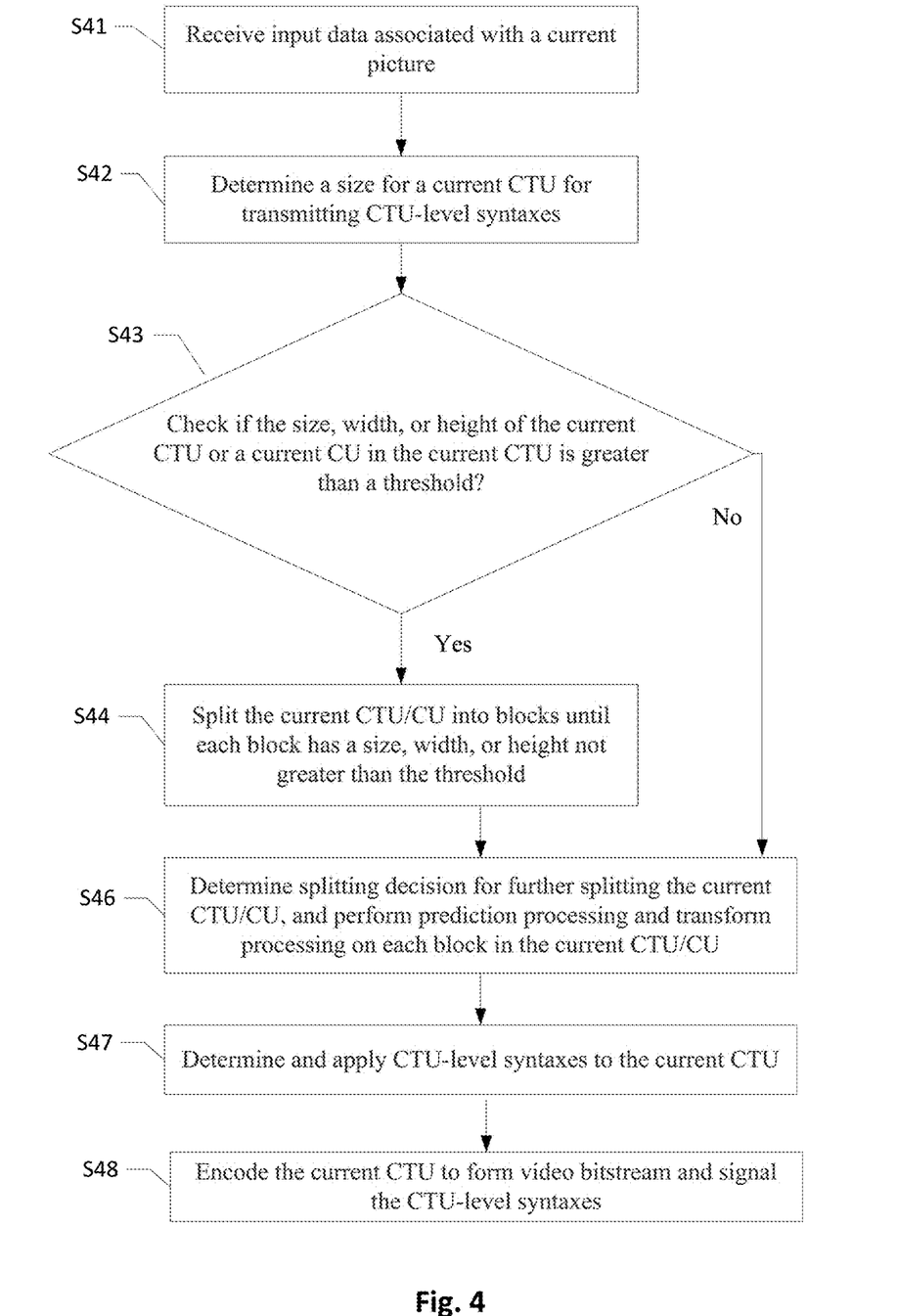
FIG. 4 is a flowchart illustrating an exemplary video encoding system according to an embodiment of the present invention.

FIG. 4 illustrates a flowchart for an exemplary video encoding system for processing video data with restricted block size according to the third embodiment of the present invention. The video encoding system receives input data associated with a current picture in step S41, and determines a size for a current CTU for transmitting of one or more CTU-level syntaxes in step S42. In step 43, the size, width, or height of the current CTU or a current CU in the current CTU is checked to determine if it is greater than a threshold. The current CTU or the current CU is split into blocks until a size, width, or height of each block is not greater than the threshold in step S44 if the checking result of step S43 is affirmed. The video encoding system proceeds step S46 if the checking result of step S43 shows the size, width, or height of the current CTU or the current CU is not greater than the threshold. In step S46, the video encoding system determines a splitting decision to further split the current CTU or the current CU, and each block in the current CTU or CU is processed by prediction and transform. The splitting decision may be determined by a RDO result which selects a best block partitioning for both prediction and transform processing. The video encoding system determines and applies the CTU-level syntaxes to the current CTU in step S47, and encodes the current CTU to form a video bitstream and signals the CTU-level syntaxes in the video bitstream in step S48.

Fourth Embodiment A fourth embodiment forces a decoder to split the current CTU or CU into smaller blocks when a size M×N, width M, or height N of the current CTU or CU is greater than a threshold. The decoder decodes information associated with the splitting decision such as split flags from a video bitstream, and further split the current CTU or CU or the smaller blocks according to the splitting decision. Each block in the current CTU or CU is then processed by prediction and inverse transform in the decoder of this embodiment. The threshold may be predefined or user-defined, and in an embodiment, the threshold is determined by parsing relevant information in the video bitstream. The threshold corresponds to a maximum supported TU size, and some examples of the threshold is 128×128 for a TU size, 128 for a TU width or TU height, 64×64 for a TU size, and 64 for a TU width or TU height. When the decoder determines the size M×N, width M, or height N of the current CTU or CU is greater than the threshold, the current CTU or CU is inferred to be split without decoding of a split flag. In other words, the quadtree split flag for the current CTU or CU is inferred to be 1 (i.e. split) when the size, width, or height is greater than the threshold and when a quadtree split is use for partitioning the current CTU or CU into four smaller blocks. In another example, a vertical split flag is inferred to be 1 (i.e. split) when the size or width is greater than the threshold and when a binary tree split is used for partitioning the current CTU or CU into two smaller blocks; a horizontal split flag is inferred to be 1 (i.e. split) when the size or height is greater than the threshold and when the binary tree split is used for partitioning the current CTU or CU into two smaller blocks. Although the decoder performs decoding processes such as prediction and inverse transform in each of the blocks of a current CTU, the CTU-level syntaxes parsed from the video bitstream are used by all the blocks in the current CTU.

The third and fourth embodiments either split the current CTU at a root-level or split the current CU until the current CTU or CU is not larger than a threshold. The basic representative block for applying prediction and transform processing is always the same in these two embodiments. The encoder and decoder according to the third and fourth embodiments allow a large CTU (e.g. 256×256) for transmitting CTU-level syntaxes while restricting the block size for transform or inverse transform processing to be less than or equal to the threshold (e.g. 128×128). In some embodiments, split flags are not signaled in the video bitstream to specify the splitting of CTUs or CUs larger than the threshold, encoders and decoder infer to split the large CTUs or CUs so bits required for signaling the split flags are saved and thus achieves better coding efficiency.

Figure 5:
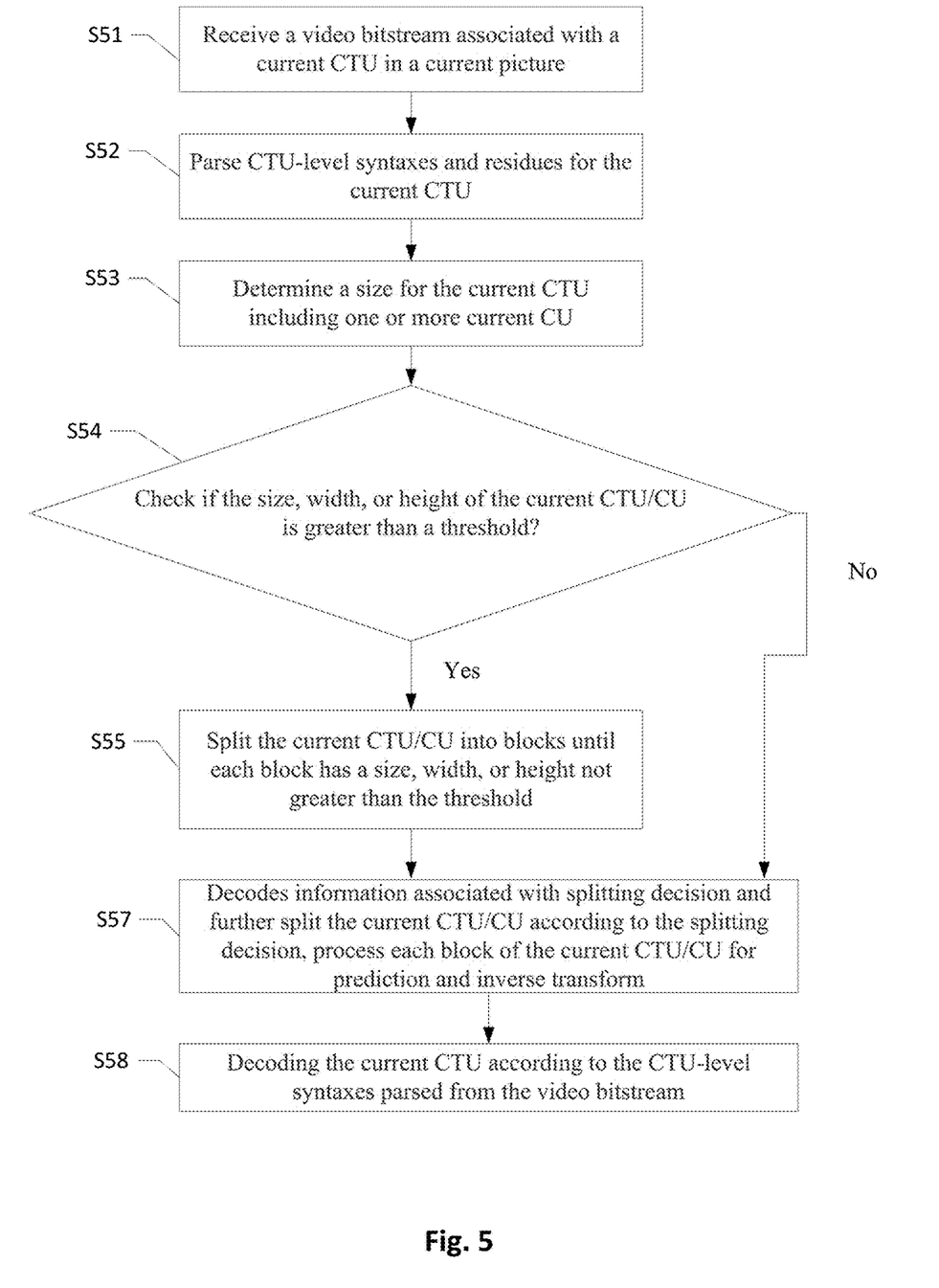
FIG. 5 is a flowchart illustrating an exemplary video decoding system according to an embodiment of the present invention.

FIG. 5 illustrates a flowchart for an exemplary video decoding system incorporating a video data processing method with restricted block size according to the fourth embodiment of the present invention. The video decoding system receives a video bitstream containing a current picture in step S51, and parses CTU-level syntaxes and residues for a current CTU in the current picture from the video bitstream in step S52. A size of the current CTU or a current CU in the current CTU is determined in step S53, and the size, width, or height of the current CTU or the current CU is compared with a threshold in step S54. If the size, width, or height of the current CTU or the current CU is greater than the threshold, step S55 splits the current CTU or the current CU into blocks until a size, width, or height of each block is not greater than the threshold. If the size, width, or height of the current CTU or the current CU is not greater than the threshold, the video decoding system proceeds step S57. In step S57, the video decoding system decodes information associated with splitting decision form the video bitstream and further splits the current CTU or CU according to the splitting decision. Step S57 further includes processing each block of the current CTU or the current CU by prediction and inverse transform. The video decoding system decodes the current CTU according to the CTU-level syntaxes in step S58.

Fifth Embodiment A fifth embodiment shares one or more CTU-level syntaxes of a current CTU with one or more other CTUs. The CTU-level syntaxes associated with coding tools such as in-loop filtering are sometimes very similar across multiple CTUs, in order to further reduce the bits carried by the bitstream, the fifth embodiment introduces a concept called CTU group. CTUs in the same CTU group share some or all CTU-level syntaxes which may include one or a combination of syntaxes or parameters for SAO, ALF, and deblocking filter. The size of the CTU group may be a predefined value or the size may be signaled in a sequence-level, picture-level, or slice-level of the video bitstream such as in SPS, PPS or slice header. In an embodiments, the CTU group size for any two of the SAO, ALF, deblocking or another loop filter may be the same or different For example, the CTU group size is represented by M×N CTUs, where M and N are both positive integer numbers, and M+N>2. A picture in the fifth embodiment is divided into CTU groups, and CTUs in the same CTU group share one or more CTU-level syntaxes. This idea of sharing CTU-level syntaxes may also be extended to share for CU, PU, or TU level syntaxes, for example, the CU or TU level transform syntaxes in one CTU are signaled once and these transform syntaxes are reused or shared by all CUs or TUs in CTUs belong to the same CTU group.

Sixth Embodiment A sixth embodiment provides an alternative solution to a block partitioning method in HEVC to split a current CTU or a current CU at a picture boundary. In HEVC, a CU at a picture boundary is inferred to be quadtree split into four sub-CUs. The sixth embodiment of the present invention determines to apply quadtree split or binary tree split to a current CTU or a current CU depending on a boundary condition of the current CTU or the current CU. Let (x0,y0) specifies a luma location of a top-left sample of a current CTU or a current CU in a current picture, cuWidth and cuHeight specify a width and height of the current CTU or the current CU, picWidth and picHeight specify a width and height of a current picture. The current CTU or the current CU is inferred to be partitioned by a quadtree split if both values (x0+cuWidth) and (y0+cuHeight) are greater than picWidth and picHeight respectively. The current CTU or the current CU is inferred to be quadtree split into four sub-CUs of the same size cuWidth/2×cuHeight/2.

If only the value (x0+cuWidth) is greater than picWidth, then the current CTU or the current CU is inferred to be partitioned into two sub-CUs according to a vertical binary tree split, and the size of the two sub-CUs is cuWidth/2× cuHeight. If only the value (y0+cuHeight) is greater than picHeight, then the current CTU or the current CU is inferred to be partitioned into two sub-CUs according to a horizontal binary tree split, and the size of the two sub-CUs is cuWidth×cuHeight/2.

Figure 6:
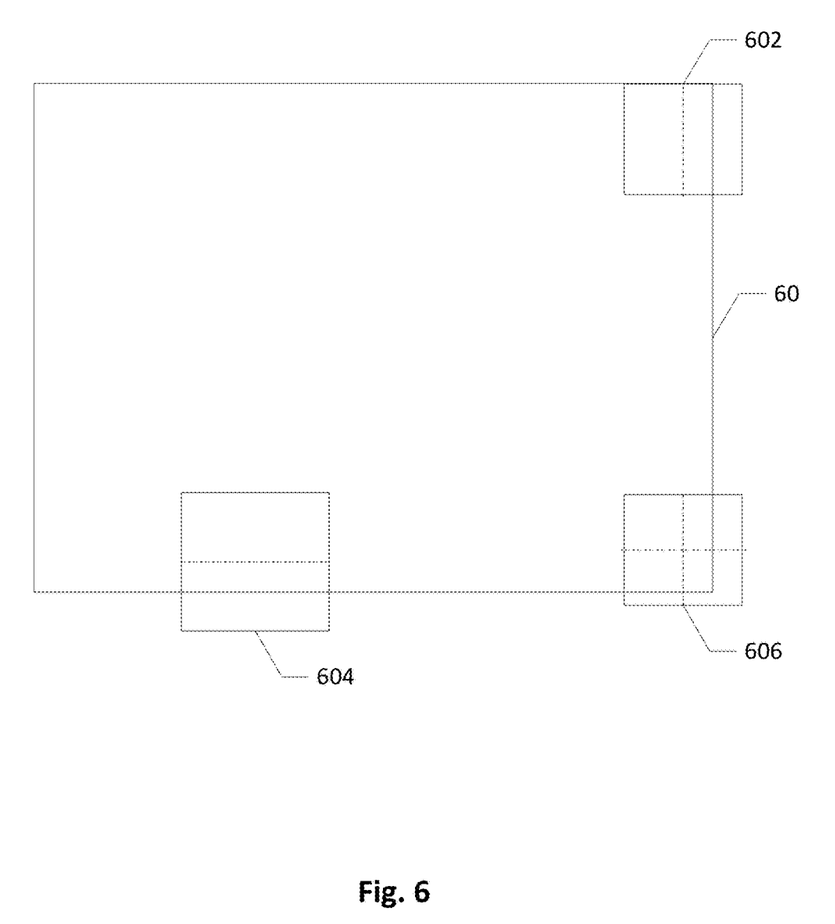
FIG. 6 illustrates a block partitioning method for blocks at a picture boundary according to an embodiment of the present invention.

An encoder or decoder according to the sixth embodiment splits a current CTU or a current CU at a picture boundary of a current picture using one of quadtree split, vertical binary split, and horizontal binary split according to a location of the current block, a width and height of the current block, and a width and height of the current picture. FIG. 6 illustrates possible splitting types for blocks at picture boundaries in accordance with the sixth embodiment. A video encoder or decoder receives input data associated with a video picture 60, and the video picture 60 is partitioned into multiple blocks including blocks 602, 604 and 606. The blocks 602, 604 and 606 may be CTUs or CUs. The block 602 at a right boundary of the video picture 60 is forced to split using a vertical binary tree split, and the block 604 at a bottom boundary of the video picture 60 is forced to split using a horizontal binary tree split. The block 606 at a bottom right boundary of the video picture 60 is split using a quadtree split.

Figure 7:
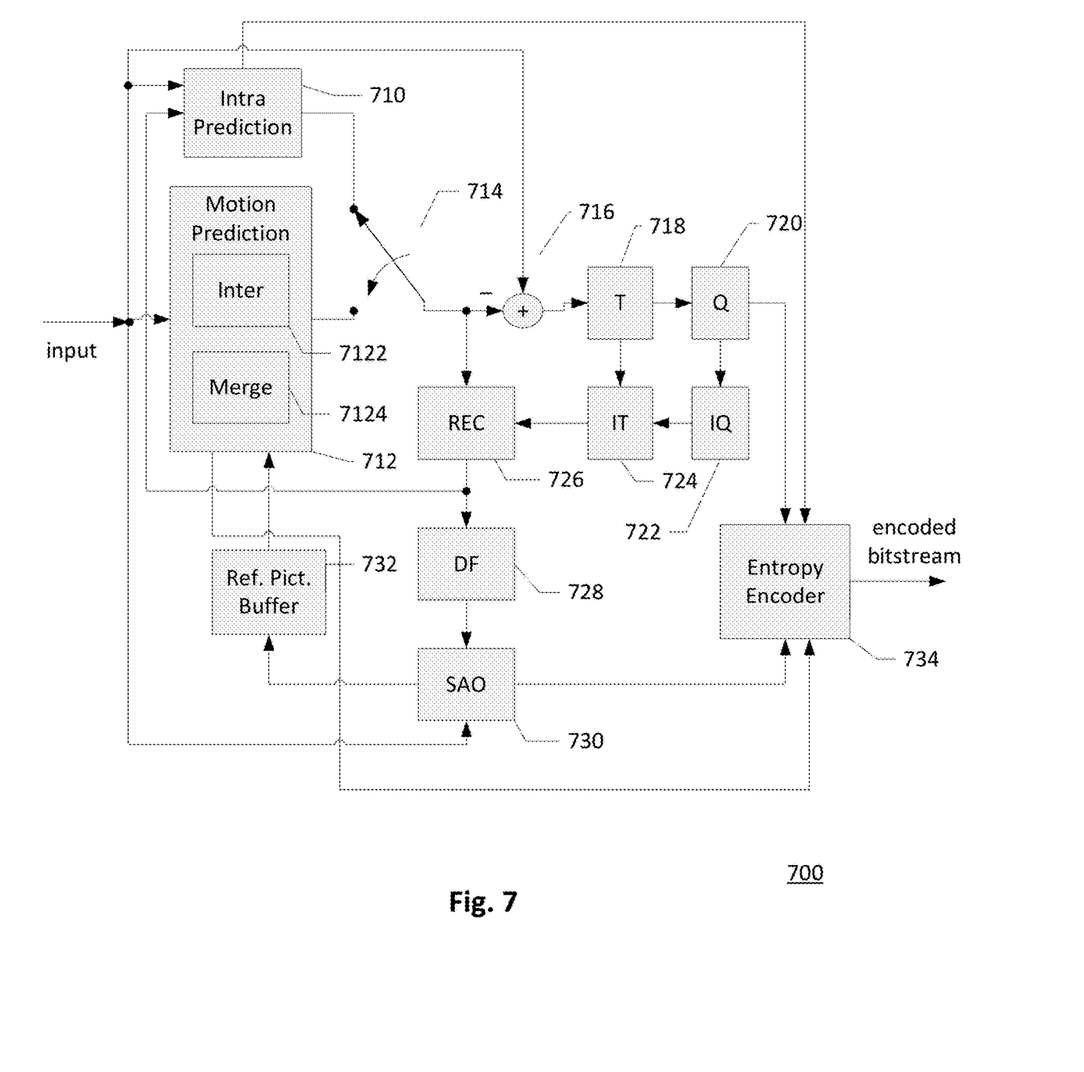
FIG. 7 illustrates an exemplary system block diagram for a video encoding system according to embodiments of the present invention.

FIG. 7 illustrates an exemplary system block diagram for a Video Encoder 700 implementing an embodiment of the present invention. Intra Prediction 710 provides intra predictors based on reconstructed video data of a current picture, whereas Motion Prediction 712 performs motion estimation (ME) and motion compensation (MC) to provide predictors based on video data from other picture or pictures. A size, width, or height of a current CTU or a current CU in the current picture is compared with a threshold, and the current CTU or the current CU is forced to be split into multiple blocks if the size, width, or height is greater than the threshold. The current CTU or the current CU may be further split according to a splitting decision in some embodiments. Each block in the current CTU or the current CU may be predicted by Intra Prediction 710 or Motion Prediction 712. The block processed by Motion Prediction 712 selects to be encoded in Inter mode by Inter Prediction 7122 or to be encoded in Merge mode by Merge prediction 7124. Switch 714 selects one of the outputs from Intra Prediction 710 and Motion Prediction 712 and supplies the selected predictor to Adder 716 to form prediction errors, also called prediction residues.

The prediction residues of each block are further processed by Transformation (T) 718 followed by Quantization (Q) 720. The transformed and quantized residual signal is then encoded by Entropy Encoder 734 to form an encoded video bitstream. The encoded video bitstream is then packed with side information such as CTU-level syntaxes. The data associated with the side information are also provided to Entropy Encoder 734. The transformed and quantized residual signal of each block is processed by Inverse Quantization (IQ) 722 and Inverse Transformation (IT) 724 to recover the prediction residues. As shown in FIG. 7, the prediction residues are recovered by adding back to the selected predictor at Reconstruction (REC) 726 to produce reconstructed video data. The reconstructed video data may be stored in Reference Picture Buffer (Ref. Pict. Buffer) 732 and used for prediction of other pictures. The reconstructed video data from REC 726 may be subject to various impairments due to the encoding processing, consequently, in-loop processing Deblocking Filter (DF) 728 and Sample Adaptive Offset (SAO) 730 are applied to each CTU of the reconstructed video data before storing in the Reference Picture Buffer 732 to further enhance picture quality. Syntax associated with information for the in-loop processing DF 728 and SAO 730 are CTU-level syntaxes, and are provided to Entropy Encoder 734 for incorporation into the encoded video bitstream.

Figure 8:
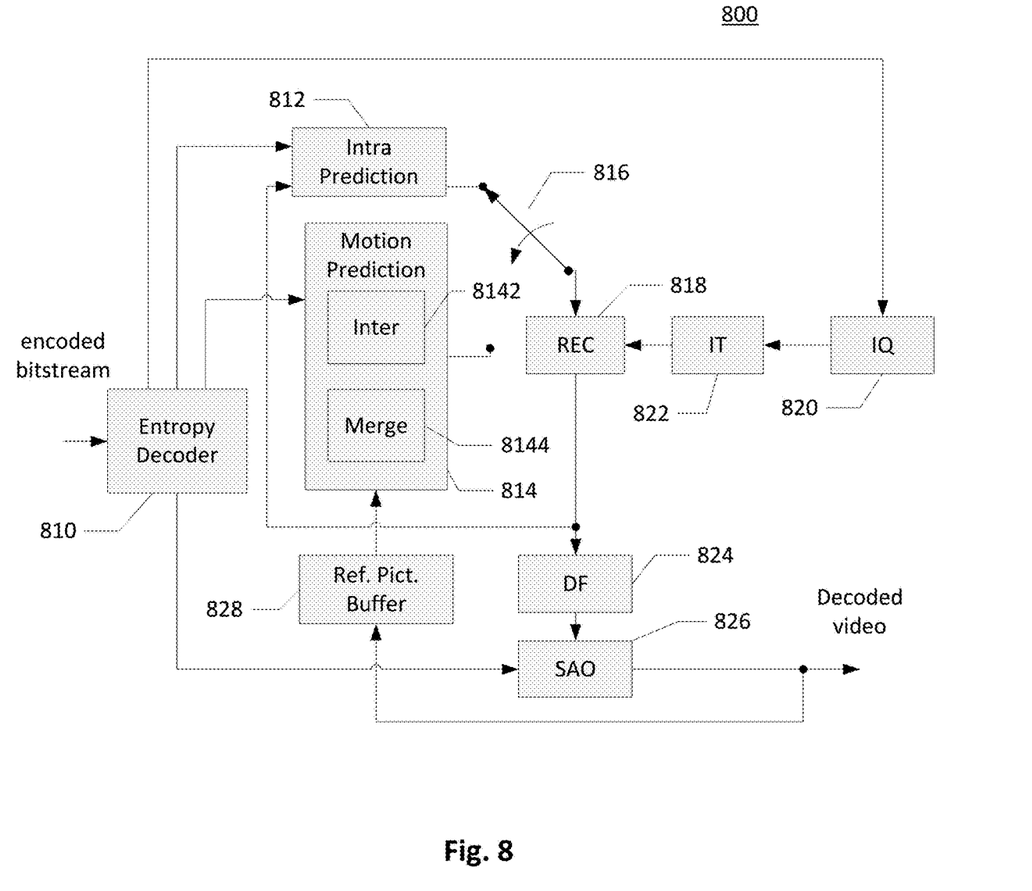
FIG. 8 illustrates an exemplary system block diagram for a video decoding system according to embodiments of the present invention.

A corresponding Video Decoder 800 for Video Encoder 700 of FIG. 7 is shown in FIG. 8. The encoded video bitstream is the input to Video Decoder 800 and is decoded by Entropy Decoder 810 to parse and recover the transformed and quantized residual signal, CTU-level syntaxes such as DF and SAO information for each CTU, and other system information. The decoding process of Decoder 800 is similar to the reconstruction loop at Encoder 700, except Decoder 800 only requires motion compensation prediction in Motion Prediction 814. Motion Prediction 814 includes Inter Prediction 8142 and Merge Prediction 8144. Decoder 800 determines a size of a current CTU or a current CU in the current CTU, if the size, width, or height of the current CTU or the current CU is greater than a threshold, Decoder 800 forces to split the current CTU or the current CU into blocks until each block has a size, width or height not greater than the threshold. The current CTU or the current CU may be further split according to information associated with the splitting decision decoded from the video bitstream according to some embodiments. Each block in the current CTU or the current CU is decoded by either Intra Prediction 812 or Motion Prediction 814. Blocks coded in Inter mode is decoded by Inter Prediction 8142 and blocks coded in Merge mode is decoded by Merge Prediction 8144. Switch 816 selects an intra predictor from Intra Prediction 812 or Inter predictor from Motion Prediction 814 according to decoded mode information. The transformed and quantized residual signal associated with each block is recovered by Inverse Quantization (IQ) 820 and Inverse Transformation (IT) 822. The recovered transformed and quantized residual signal is reconstructed by adding back the predictor in REC 818 to produce reconstructed video. The reconstructed video of each CTU is further processed by DF 824 and SAO 826 to generate final decoded video according to the CTU-level syntaxes. If the currently decoded picture is a reference picture, the reconstructed video of the currently decoded picture is also stored in Ref. Pict. Buffer 828 for later pictures in decoding order.

Various components of Video Encoder 700 and Video Decoder 800 in FIG. 7 and FIG. 8 may be implemented by hardware components, one or more processors configured to execute program instructions stored in a memory, or a combination of hardware and processor. For example, a processor executes program instructions to control receiving of input data associated with a current picture. The processor is equipped with a single or multiple processing cores. In some examples, the processor executes program instructions to perform functions in some components in Encoder 700 and Decoder 800, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above. As shown in FIGS. 7 and 8, Encoder 700 and Decoder 800 may be implemented in the same electronic device, so various functional components of Encoder 700 and Decoder 800 may be shared or reused if implemented in the same electronic device. For example, one or more of Reconstruction 726, Transformation 718, Quantization 720, Deblocking Filter 728, Sample Adaptive Offset 730, and Reference Picture Buffer 732 in FIG. 7 may also be used to function as Reconstruction 818, Transformation 822, Quantization 820, Deblocking Filter 824, Sample Adaptive Offset 826, and Reference Picture Buffer 828 in FIG. 8, respectively.

Embodiments of the block partitioning method for the video coding system may be implemented in a circuit integrated into a video compression chip or program code integrated into video compression software to perform the processing described above. For examples, the decision for block partitioning may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing video data in a video encoding system, comprising:
    receiving input data associated with a current picture of the video data;
    determining a size for a current coding tree unit (CTU) in the current picture for transmitting one or more CTU-level syntaxes;
    checking if the size, a width, or a height of the current CTU or a current coding unit (CU) is greater than a threshold, wherein the current CTU includes one or more current CUs;
    if the size, width, or height of the current CTU or the current CU is greater than the threshold, splitting the current CTU or the current CU into multiple blocks until a size, width, or height of each block in the current CTU or the current CU is not greater than the threshold;
    processing the current CTU or the current CU for prediction and transform;
    determining the one or more CTU-level syntaxes for the current CTU and processing the current CTU according to the one or more CTU-level syntaxes; and
    encoding the current CTU to form a video bitstream and signaling the CTU-level syntaxes in the video bitstream.

2. The method of claim 1, wherein the threshold is a maximum supported transform unit (TU) size.

3. The method of claim 1, wherein the current CTU or the current CU is split using quadtree split or binary tree split if the size, width, or height of the current CTU or the current CU is greater than the threshold; and a split flag is signaled in the video bitstream to indicate the splitting of the current CTU or the current CU.

4. The method of claim 1, wherein the one or more CTU-level syntaxes comprise one or a combination of syntaxes for sample adaptive offset (SAO), adaptive loop filter (ALF), and deblocking filter, and said processing the current CTU comprises applying one or a combination of SAO, ALF, and deblocking filter to the current CTU.

5. The method of claim 1, wherein the one or more CTU-level syntaxes for the current CTU are shared with other CTUs in a same CTU group.

6. The method of claim 5, wherein the CTU group includes M×N CTUs, M and N are positive integer numbers, and a size of the CTU group is a predefined value or is signaled in a sequence level, a picture level, or a slice level in the video bitstream.

7. The method of claim 5, wherein the CTUs in the same CTU group share one or a combination of syntaxes for sample adaptive offset (SAO), adaptive loop filter (ALF), and deblocking filter.

8. The method of claim 1, further comprising splitting the current CTU or the current CU using qudtree split, vertical binary tree split, or horizontal binary tree split according to a location of the current CTU or the current CU, the width and height of the current CTU or the current CU, and a width and height of the current picture.

9. The method of claim 1, wherein said processing the current CTU or the current CU for prediction and transform comprises performing prediction processing on the current CU and performing transform processing on each block in the current CU if the current CU is split, and performing both prediction processing and transform processing on the current CU if the current CU is not split.

10. A method of processing video data in a video decoding system, comprising:
    receiving a video bitstream associated with a current coding tree unit (CTU) in a current picture;
    parsing one or more CTU-level syntaxes and residues for the current CTU from the video bitstream;
    determining a size for the current CTU or a current coding unit (CU), wherein the current CTU includes one or more current CUs;
    checking if the size, a width, or a height of the current CTU or the current CU is greater than a threshold;
    if the size, width, or height of the current CTU or the current CU is greater than the threshold, splitting the current CTU or the current CU into multiple blocks until a size, width, or height of each block in the current CTU or the current CU is not greater than the threshold;
    processing the current CTU or the current CU for prediction and inverse transform; and
    decoding the current CTU according to the one or more CTU-level syntaxes parsed from the video bitstream.

11. The method of claim 10, wherein the threshold is a maximum supported transform unit (TU) size.

12. The method of claim 10, wherein the current CTU or the current CU is split using quadtree split or binary tree split if the size, width, or height of the current CTU or the current CU is greater than the threshold.

13. The method of claim 10, wherein the one or more CTU-level syntaxes comprise one or a combination of syntaxes for sample adaptive offset (SAO), adaptive loop filter (ALF), and deblocking filter, and said decoding the current CTU comprises applying one or a combination of SAO, ALF, and deblocking filter to the current CTU.

14. The method of claim 10, wherein the one or more CTU-level syntaxes for the current CTU are shared with other CTUs in a same CTU group.

15. The method of claim 14, wherein the CTU group includes M×N CTUs, M and N are positive integer numbers, and a size of the CTU group is a predefined value or is parsed from a sequence level, a picture level, or a slice level in the video bitstream.

16. The method of claim 14, wherein the CTUs in the same CTU group share one or a combination of syntaxes for sample adaptive offset (SAO), adaptive loop filter (ALF), and deblocking filter.

17. The method of claim 10, further comprising splitting the current CTU or the current CU using qudtree split, vertical binary tree split, or horizontal binary tree split according to a location of the current CTU or the current CU, the width and height of the current CTU or the current CU, and a width and height of the current picture.

18. The method of claim 10, wherein said processing the current CTU or the current CU for prediction and inverse transform comprises performing prediction processing on the current CU and performing inverse transform processing on each block in the current CU.

19. An apparatus of processing video data in a video decoding system, the apparatus comprising one or more electronic circuits configured to:

receiving a video bitstream associated with a current coding tree unit (CTU) in a current picture;

parsing one or more CTU-level syntaxes and residues for the current CTU from the video bitstream;

determining a size for the current CTU or a current coding unit (CU), wherein the current CTU includes one or more current CUs;

checking if the size, a width, or a height of the current CTU or the current CU is greater than a threshold;

if the size, width, or height of the current CTU or the current CU is greater than the threshold, splitting the current CTU or the current CU into multiple blocks until a size, width, or height of each block in the current CTU or the current CU is not greater than the threshold;

processing the current CTU or the current CU for prediction and inverse transform; and decoding the current CTU according to the one or more CTU-level syntaxes parsed from the video bitstream.

* * * * *